(12) United States Patent
Corning et al.

(10) Patent No.: US 8,170,939 B2
(45) Date of Patent: May 1, 2012

(54) METHOD AND SYSTEM FOR BUILDING AND MAINTENANCE WATCH LISTS

(75) Inventors: Douglas Corning, San Francisco, CA (US); Natalie Lera, Oakland, CA (US); Jennifer Kwan, San Francisco, CA (US); Corinne Wayshak, Los Altos, CA (US); Christopher Burmester, Kensington, CA (US)

(73) Assignee: Charles Schwab & Co., San Francisco, CA (US)

( * ) Notice: Subject to any disclaimer, the term of this patent is extended or adjusted under 35 U.S.C. 154(b) by 245 days.

(21) Appl. No.: 11/951,852

(22) Filed: Dec. 6, 2007

(65) Prior Publication Data

US 2008/0140587 A1    Jun. 12, 2008

Related U.S. Application Data

(63) Continuation of application No. 09/591,912, filed on Jun. 9, 2000, now Pat. No. 7,333,951.

(60) Provisional application No. 60/190,739, filed on Mar. 20, 2000.

(51) Int. Cl.
*G06Q 40/00* (2006.01)

(52) U.S. Cl. .......................... 705/36 R; 705/37; 705/42

(58) Field of Classification Search ................ 705/35–42
See application file for complete search history.

(56) References Cited

U.S. PATENT DOCUMENTS

| | | | |
|---|---|---|---|
| 5,339,392 A | 8/1994 | Risberg et al. | |
| 5,864,871 A | 1/1999 | Kitain et al. | |
| 5,920,848 A | 7/1999 | Schutzer et al. | |
| 6,014,643 A | 1/2000 | Minton | |
| 6,078,924 A | 6/2000 | Ainsbury et al. | |
| 6,195,647 B1 | 2/2001 | Martyn et al. | |
| 6,408,282 B1 | 6/2002 | Buist | |
| 6,462,671 B2 | 10/2002 | Bushner et al. | |
| 6,493,683 B1 | 12/2002 | David et al. | |
| 6,526,285 B1 | 2/2003 | Matsumoto et al. | |
| 6,567,807 B1 | 5/2003 | Robles et al. | |
| 6,574,630 B1 | 6/2003 | Augustine et al. | |
| 6,647,410 B1 | 11/2003 | Scimone et al. | |
| 6,681,211 B1 | 1/2004 | Gatto | |

OTHER PUBLICATIONS

Pearl, R.; "SmartServ's Alliance Program Expands Presence at CTIA's Wireless 2000"; 2000, PR Newswire, 1 page.
Santoli, M.; "Trading Across the Airwaves"; 1999, Barron's Chicopee, vol. 79, No. 46, 2 pages.

*Primary Examiner* — Hani M Kazimi
(74) *Attorney, Agent, or Firm* — Kilpatrick Townsend & Stockton LLP

(57) ABSTRACT

A method and apparatus for monitoring a items such as stocks and other securities, suitable for use in portable devices, such as personal organizers, wherein instead of separate watch lists, a pool of items being watched is maintained, and the total number of items which can be contained in the pool is intentionally limited to a predefined number, and further wherein each of the items in the pool includes an associated tag which defines a watch list to which it belongs, and the pool of the items being watched can be viewed simultaneously as one coherent collection, or specific watch lists can be displayed.

14 Claims, 12 Drawing Sheets

POOL OF ITEMS

~22

| ITEM # | ITEM NAME | WATCH LIST TAG |
|---|---|---|
| 1 | S1 | L15 |
| 2 | S2 | L1 |
| 3 | S3 | L2 |
| 4 | S4 | L3 |
| 5 | S5 | L4 |
| 6 | S6 | L1 |
| 7 | S7 | L15 |
| 8 | S7 | L1 |
| 9 | S8 | L12 |
| 10 | S9 | L5 |
| 11 | S10 | L6 |
| 12 | S11 | L7 |
| 13 | S12 | L10 |
| 14 | S13 | L6 |
| 15 | S14 | L8 |
| 16 | S15 | L11 |
| 17 | S16 | L11 |
| * | * | * |
| * | * | * |
| * | * | * |
| 63 | S33 | L2 |
| 64 | S33 | L8 |
| 65 | S34 | L9 |
| 66 | S34 | L11 |
| 67 | S35 | L7 |
| 68 | S36 | L1 |
| * | * | * |
| * | * | * |
| * | * | * |
| 94 | S55 | L15 |
| 95 | S56 | L1 |
| 96 | S57 | L4 |
| 97 | S58 | L17 |
| 98 | S58 | L28 |
| 99 | S59 | L13 |
| 100 | S60 | L6 |

WATCH LISTS

| LIST L1 |
|---|
| S2 |
| S6 |
| S7 |
| * |
| * |
| * |
| S36 |
| * |
| * |
| * |
| S56 |
| * * * |

| LIST L11 |
|---|
| S16 |
| S17 |
| * |
| * |
| * |
| S34 |
| * * * |

| LIST L15 |
|---|
| S1 |
| S7 |
| * |
| * |
| * |
| S55 |
| * * * |

| LIST L28 |
|---|
| S58 |

Figure 2

PRIMARY DROP DOWN 32
ACCOUNT
WATCH LIST → → →   → → →
TRADE
QUOTE
NEWS
ALERTS
CUSTOMIZE
* * *

**SECONDARY DROP DOWN 34
(FOR WATCH LIST)**
USER WATCHLIST 1
USER WATCHLIST 2
USER WATCHLIST 3
USER WATCHLIST 4
* * *
USER WATCHLIST 12
* * *
USER WATCHLIST N
MANAGER

METHOD AND SYSTEM FOR BUILDING AND MAINTENANCE WATCH LISTS

PRIORITY CLAIM UNDER 35 USC §119

This application is a continuation application of U.S. patent application Ser. No. 09/591,912, filed on Jun. 9, 2000 which claims the benefit of priority of U.S. Provisional Application No. 60/190,739 filed Mar. 20, 2000 under 37 USC §119, all of which are hereby incorporated by reference in their entirety.

TECHNICAL FIELD

The present invention is directed to data organization in personal hand held organizers, and more particularly to a method and apparatus which maintains and organizes lists of and information about securities being monitored by a user in a personal hand held organizer operating over a wireless link.

BACKGROUND OF THE INVENTION

In the past, watch lists management has been focussed on maintaining a variety of different watch lists. The items in each watch list were maintained and changed independently of the other watch lists. These systems are sometimes referred to as a "bucket" system where multiple "buckets" of data are maintained, each bucket being maintained independently of the others.

Examples of these "bucket" systems can be found, for example, at the URL investing.schwab.com of Charles Schwab & Co., Inc., the assignee of the subject application, in the Charles Schwab Customer Center Watch List service, found in Quotes & Research; or in the Morgan Stanley Dean Witter wireless product called "Traderunner" in which lists of securities being monitored are maintained in buckets.

Bucket type systems lead to large numbers of items in the watch lists, with little coordination among the watch lists. This is particularly troublesome in the wireless world where it is important to limit the amount of information being transmitted.

In the Palm Pilot personal organizer, manufactured by 3COM Corporation of Santa Clara, Calif., applications are listed in a master list. When a user selects an application from the master list, the application is launched.

SUMMARY OF THE INVENTION

In the present invention, instead of separate independent watch lists, a pool of items being watched is maintained. In one embodiment of the present invention, the total number of items, which can be contained in the pool, is intentionally limited to a predefined number. Each of the items in the pool includes an associated tag, which defines a watch list to which it belongs. The pool of the items being watched can be viewed simultaneously as one coherent collection, or specific watch lists can be displayed. When a specific watch list is being displayed, the items that are displayed are those which are assigned to that watch list as indicated by their associated tag. When the pool of items is being viewed in one embodiment of the present invention, the user is provided with a visual indication of the total number of items in the pool and the maximum number of items allowed in the pool of items.

In the preferred embodiment of the invention, the items being watched are stocks or securities. Each stock being watched is assigned to a watch list or lists. For purposes of the predefined limit on the number of items in the pool, when a stock is assigned to more than one watch list, each assignment is treated as a separate item which counts toward the predefined limit. Thus, a stock assigned to two different watch lists is considered to be two separate items in the pool of items being watched.

The above architecture provides a more compact and efficient organization for monitoring the status of the pool of items, permits the contents of specific watch list categories to be changed from one central location, yet provides the flexibility of viewing subsets of the pool in different combinations according to the criteria provided by the user. This is particularly important with modern portable devices, such as personal organizers, which have limited storage capacities as well as limited communication bandwidths.

The subject invention will be more readily understood upon consideration of the following detailed description and accompanying drawings.

BRIEF DESCRIPTION OF THE DRAWINGS

FIG. 2 illustrates the organizational structure of the pool of items being monitored, the watch lists which can be assembled from the pool, and the relationship between them.

DETAILED DESCRIPTION OF THE INVENTION

Figure 1:
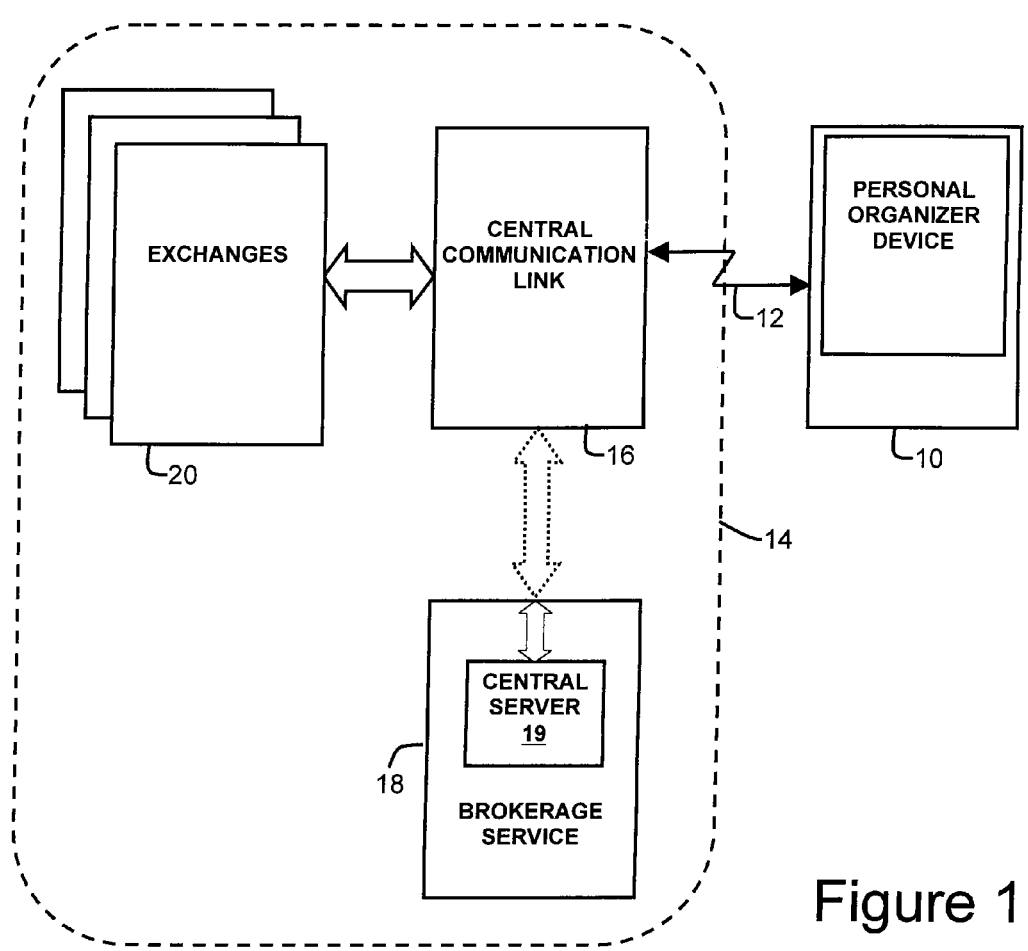
FIG. 1 is a simplified conceptual block diagram illustrating an example of the environment within which the subject invention is operable.

Referring to FIG. 1, one embodiment of the present invention is operable in a personal organizer 10, which communicates via a wireless link 12 with central communications center 14. The central communications center 14 can be self-contained so that it incorporates a central communications link 16, brokerage services 18, and exchanges 20, or can be formed through links as shown in the figure. Located at the central communications center 14, for example, at the brokerage service 18, is a central server 19, which holds information about the items in the pool of items being monitored. The information in the central server 19 can be gathered from the exchanges 20, the brokerage service 18, the personal communications device 10, or from other sources. The central server 19 exchanges information with the personal communications device 10 in order to maintain the pool of items and to populate the watch lists.

FIG. 2 illustrates the relationship between the pool of items being maintained in the personal organizer 10 in accordance with the present invention and the associated watch lists. The pool of items being monitored is maintained in a master list 22. The master list 22 is intentionally limited in the number of items it can hold; in the illustrated example, the limit is 100 items. In the example of FIG. 2, each item in the master list 22 includes the name of the security being tracked, and a watch list tag, which indicates to which watch list or lists the item is assigned. For example, the $10^{th}$ item in master list 22 corresponds to security S9 and is assigned to watch list L5; and the $68^{th}$ item corresponds to security 36 which is assigned to watch list L1. Note that the same security can be assigned to several different watch lists, e.g. security S7 is assigned to watch lists L1 and L15. It is also to be noted that security S7 assigned to watch list L1 is considered as a separate and distinct item from security S7 assigned to watch list L15.

FIG. 2 also illustrates example watch lists L1, L11, L15 and L28. Note that a watch list can contain as little as one item, or can contain many items.

It is to be understood that the master list 22 and the specific watch lists shown in FIG. 2 are merely illustrative. For example, it is not necessary within the spirit of the present invention to assign an item number to each item being watch, as long as the total number of items in the list is limited to a predetermined number. Nor is it necessary to organize the list in ascending alphanumeric order as is shown in FIG. 2.

In order to better understand the present invention, a more detailed description of one embodiment of the present invention will now be provided in the context of a Palm Pilot personal organizer, manufactured by 3COM corporation of Santa Clara, Calif. It is to be understood that the present invention is suitable for use in other personal organizers or portable devices, and is not limited to the Palm Pilot device.

Figure 3:
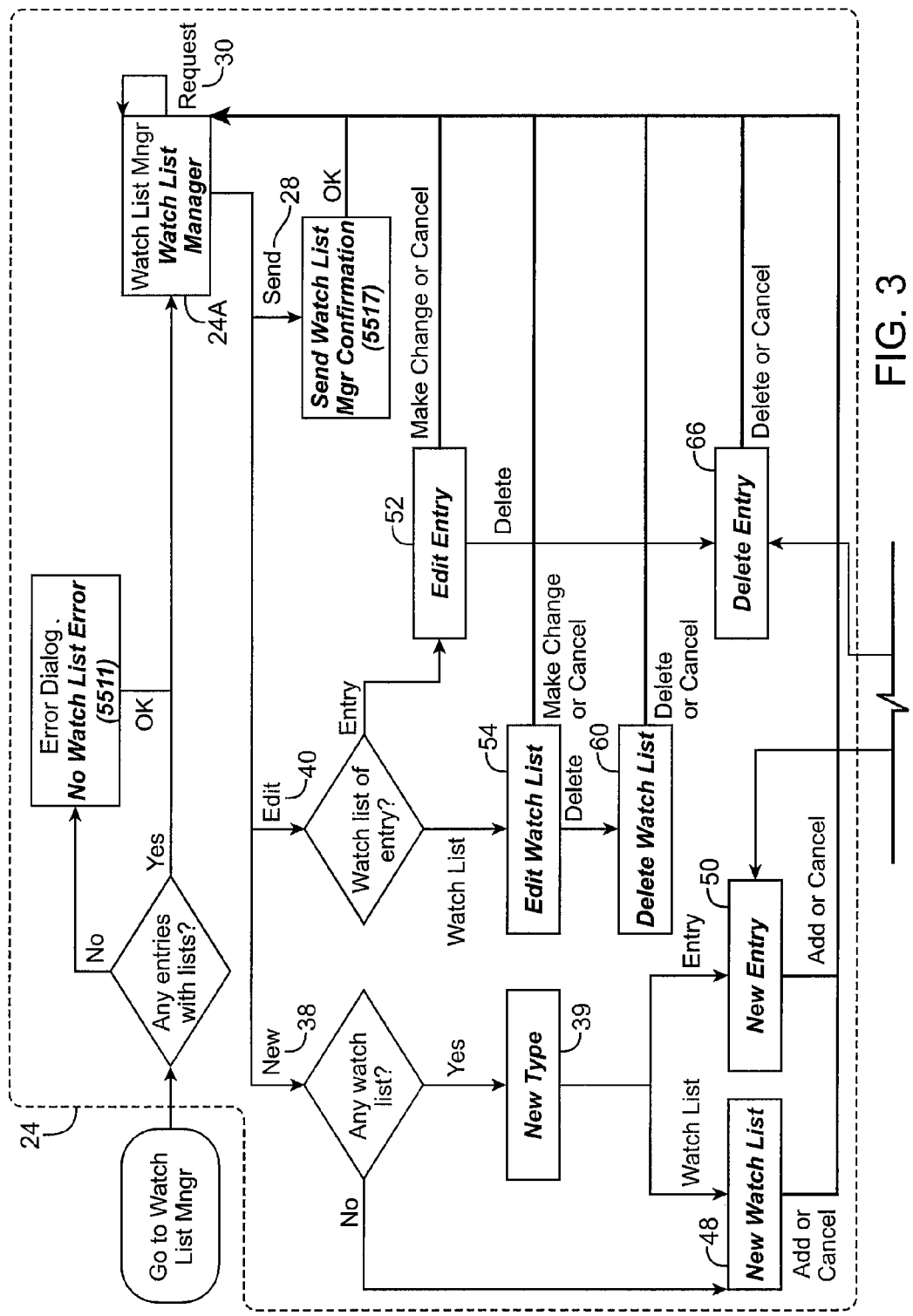
FIG. 3 is a simplified flow diagram which illustrates the operational flow of one embodiment of the present invention as implemented in a Palm Pilot hand held personal organizer.
Figure 3:
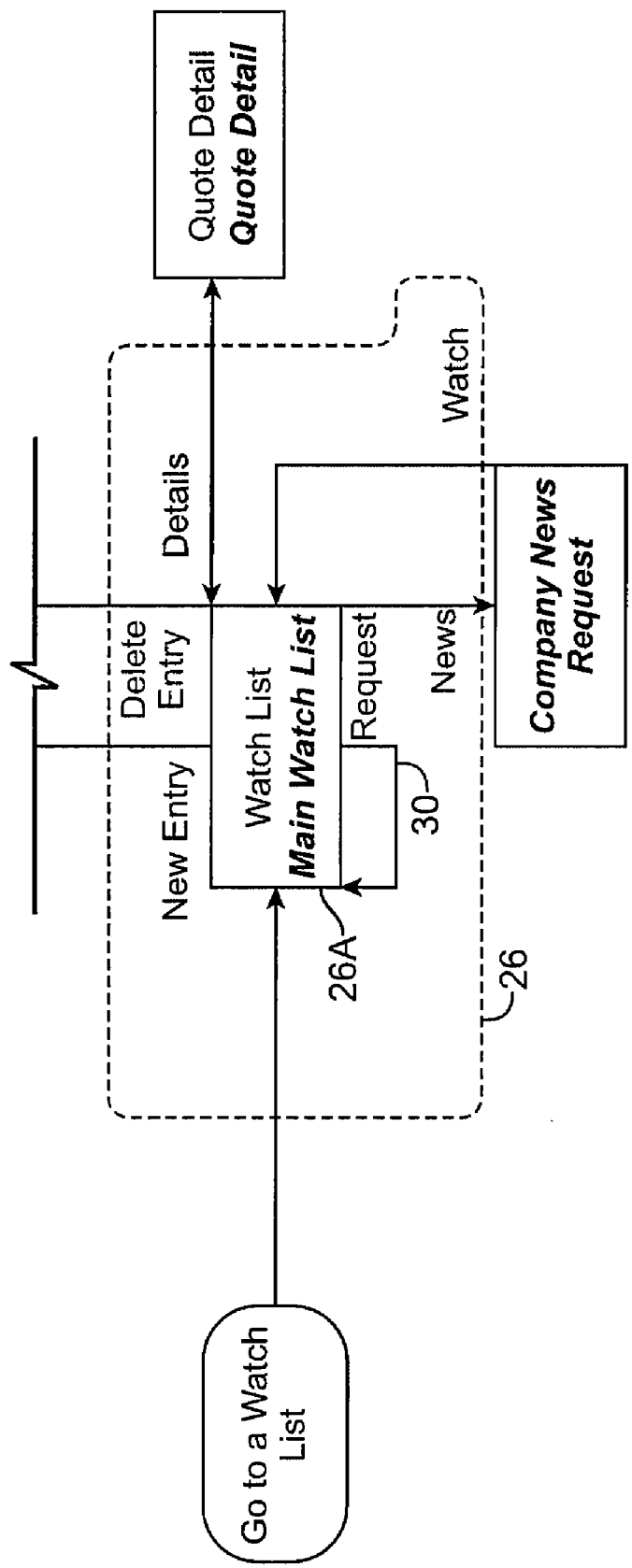

FIG. 3 provides an operational flow diagram of the invention as it can be embodied in the Palm Pilot device. In this embodiment, the user works with the watch list data at two levels: the Watch List Manager Level 24 or at the Watch List Level 26. In the Watch List Manager Level 24, the user is able to manage watch lists by adding, editing, and deleting watch lists. He will also manage the creation of new entries to lists here and the deletion of them. At the Watch List Level 26 the user will be able to view information about the items in the watch list which is selected for viewing.

Watch List Manager Level 24:

At the Watch List Manager Level 24 communication is had with the central communications center 14 through the Send 28 and Request 30 operations. In the embodiment of the present invention described hereinafter, the preferred mechanism for communicating between the personal communications device 10 and the central communications center 14, is a wireless modem (not shown). It is through the Send operation 28 that the central server 19 is informed of changes made by the user to the items within the master list 22, including deletions and additions to the master list 22, and edits to the items in the master list 22. The Request operation 30 is used to retrieve up-to-date information from the central communications center 14 about the items in the master list 22.

At the Watch List Level 26 the user uses the Request operation 30 to communicate with the central communications center 14 to retrieve up-to-date for the items in the Watch List being viewed. If, while in the Watch List Level 26 the user wishes to add, delete or edit watch lists or items in a watch list, menu selections or buttons are provided which navigate the user back to the Watch List Manager Level 24.

Figures 4, 5:
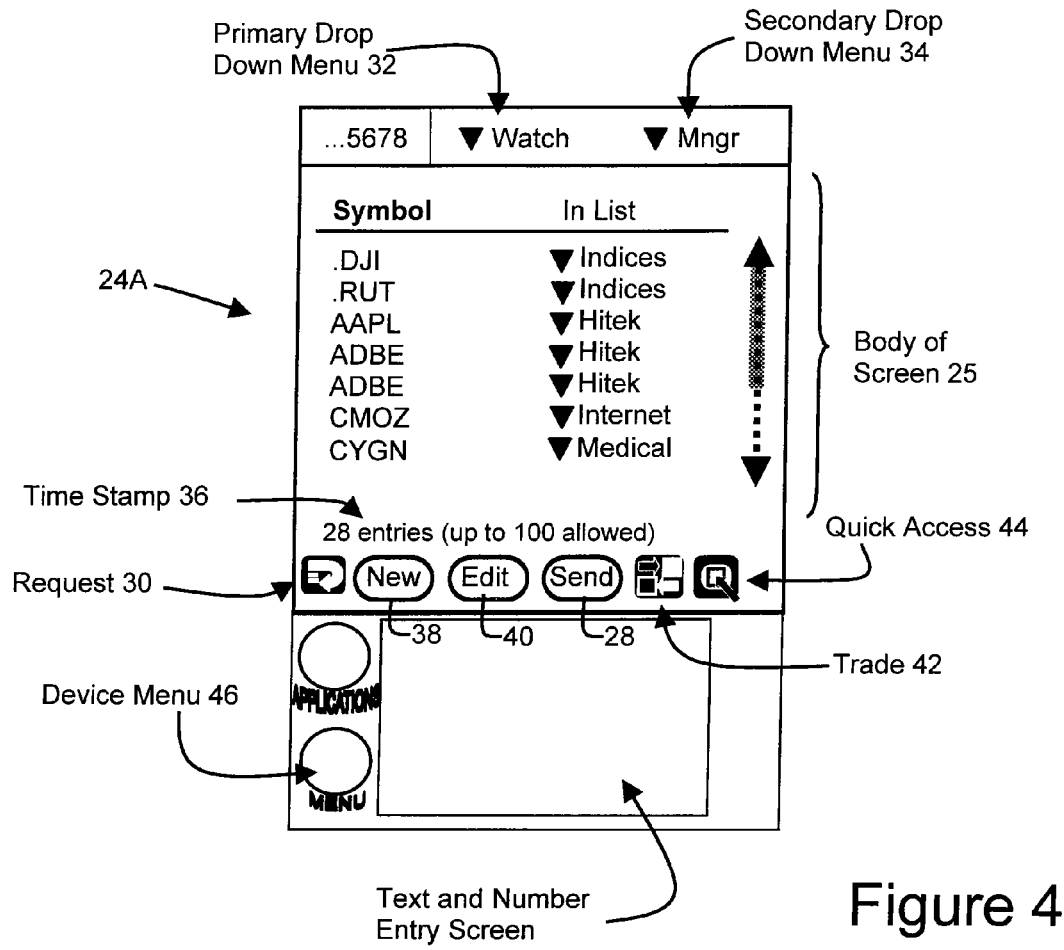
FIG. 4 simplified diagram which illustrates the screen and functional layout of one embodiment of the present invention as implemented in a Palm Pilot hand held personal organizer, where an example is shown of a pool of items which is being monitored.
FIG. 5 in an example of the relationship between the primary drop down and secondary drop down menus, and the navigation between the watch list manager and specific watch lists of the embodiment of the present invention as implemented in a Palm Pilot hand held personal organizer.

Referring now to FIG. 4, the screen 25 and functional layout of one embodiment of the present invention as implemented in a Palm Pilot hand held personal organizer is shown. FIG. 5 illustrates an example of the primary drop down and secondary drop down menus used in the Palm Pilot embodiment of FIG. 4 through which navigation between the Watch List Manager Level 24 and Watch List Level 26 is accomplished. It is to be understood that in the embodiment being described, the invention is implemented as one feature—the Watch List feature—among several features in an application designed for use on a Palm Pilot device. The user selects the Watch List feature from among the other features by using the Primary Drop Down menu 32.

In FIG. 4, the primary drop down menu 32 is shown at the top center of the screen layout and has an inverted arrow head which indicates, according to the Palm Pilot protocol, the presence of a drop down menu. As can be seen from FIG. 5, the items within primary drop down menu 32 includes the Watch List feature as a selection. In FIG. 4, the screen of information being displayed corresponds to the Watch List Manager Level 24, and functional block 24A of FIG. 3.

FIG. 5 also illustrates the secondary drop down menu 34 which lists the available functions once the Watch List feature is selected from the primary drop down menu 32. It is to be noted that the Manager function is listed at the bottom of the secondary drop down menu 34, below the list of specific watch lists which can be accessed. By selecting the Manager function from Secondary Drop Down Menu 34, the user will be navigated to the screen shown in FIG. 4.

In FIG. 4, the secondary drop down menu 34 is shown in the upper right hand corner of the screen layout. The abbreviation "Mngr" is shown in the secondary drop down menu 34 location, thereby indicating that the device is in the Watch List Manager Level 24. Thus, within the body of the screen 25, seven of the items in the master watch list 22 are being displayed. For example, stock symbol ADBE is shown to be included in the two watch lists called "hitek" the watch list. It is to be noted, in the preferred embodiment, duplication of watch list items is permitted. It has been found that such permitted duplication makes reorganization and editing of the lists easier.

The inverted arrowhead next to each listed watch list indicates that a Watch List pull down menu of other watch list selections can be invoked. When the Watch List pull down is invoked for a particular entry (item being monitored), the Watch List associated with the entry can be changed. When this is done, that entry will be associated with the newly-selected Watch List and removed from the prior Watch List. For example, the item (entry) CYGN is associated with the Watch List "Medical." The user can invoke the Watch List pull down menu by tapping on the inverted arrowhead which precedes the word "Medical." The user can then select, for example, "Hitek," and thereby cause CYGN to be removed from the "Medical" watch list, and to be added to the "Hitek" watch list. This operation corresponds to functional block 52 in FIG. 3.

The columns shown in screen 25 are sortable. A header shown in bold indicates that the corresponding column is sorted. The column is by tapping on the header title. The default is ascending alphabetical on first tap. Subsequent taps reverse the sort order if an item is already selected.

In the embodiment of FIGS. 3 and 4, The user is allowed to have 100 stock or index entries and can manage them in any combination of lists, with the only rule being that there can be no more than 100 Watch Lists. If an entry appears twice, it is counted as two entries. The time stamp region 36 of the screen 25 informs the user of how many entries are in the list and that there are up to 100 allowed. It has been found that the use of the time stamp region 36 in this manner, to inform the user of the maximum number of items allowed, and the current (or running) total of items in the watch list, is an efficient, simple and effective method for instructing the user in the use and the organizational methodology of the present invention.

When the device is in the Watch List Level 26, the time stamp region 36 indicates the time the data was retrieved. The time stamp region 26 also has a dynamic indicator of how many minutes old the data is (i.e. if the user enters a screen when the data is 15 minutes old, then sits for two minutes, the screen shows that the data is 17 minutes old). The time and time zone are that of the data source. The time zone is included and is displayed as EST or EDT as appropriate.

Figure 6:
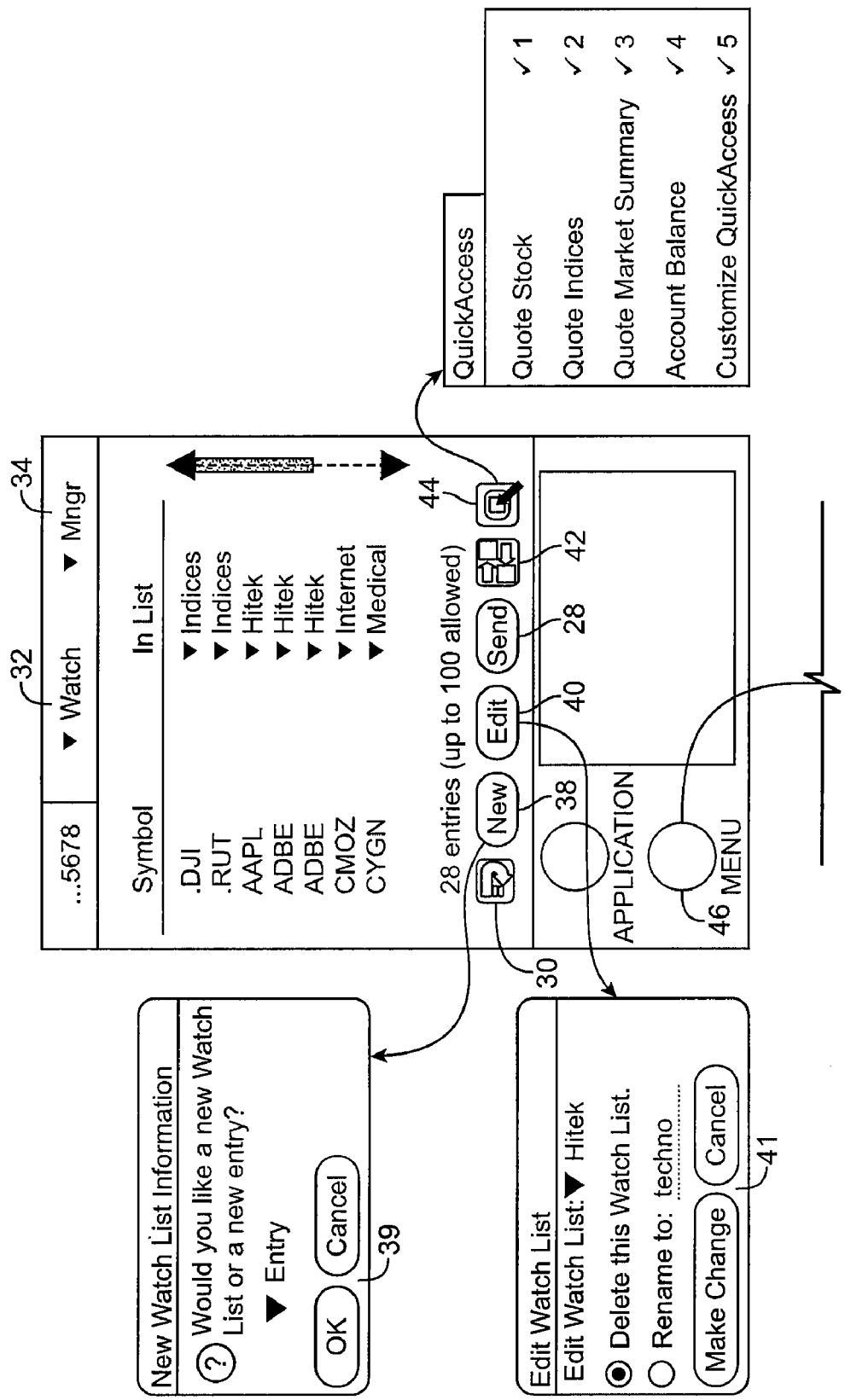
FIG. 6 is an illustrative example of operations assigned to various buttons in the embodiment of the present invention as implemented in a Palm Pilot hand held personal organizer.
Figure 6:
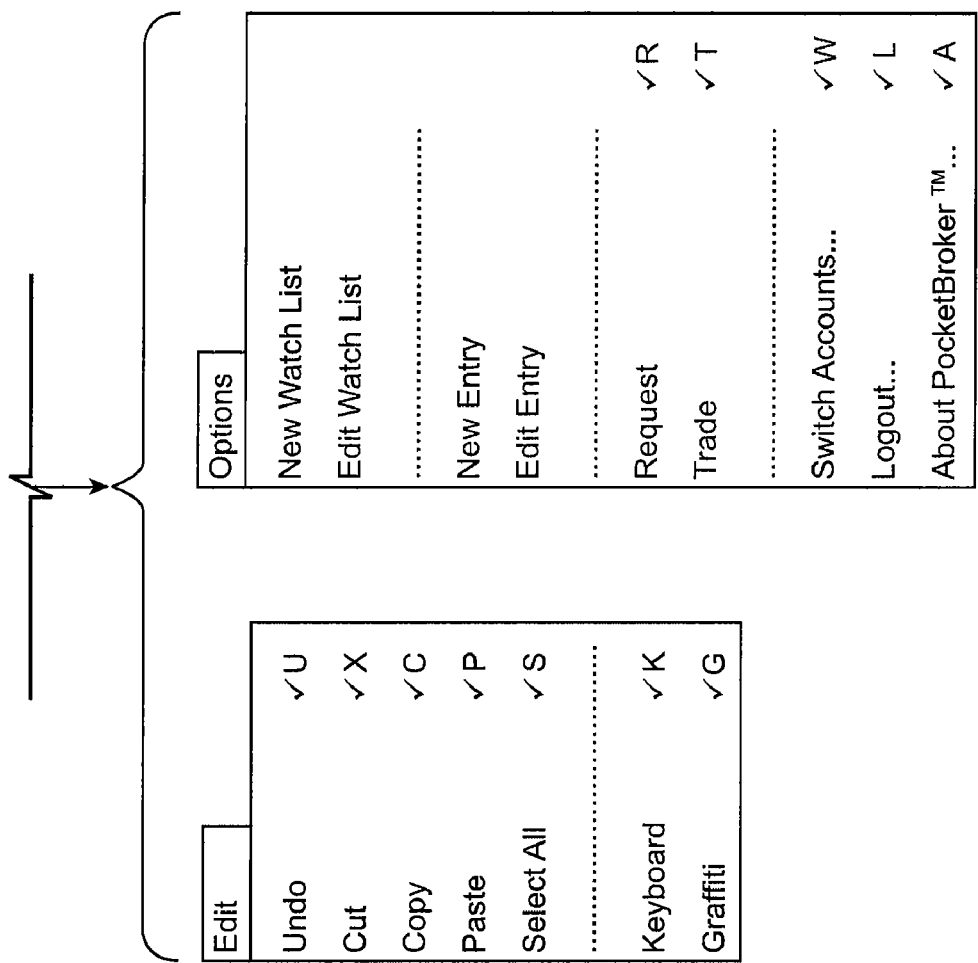

Referring now to FIGS. 4 and 6, there are several icons and buttons below the time stamp region 36: "Request" icon 30, "New" button 38, "Edit" button 40, "Send" button 28, "Trade" icon 42, and "Quick Access" icon 44. Tapping the "Request" icon 30 causes the Palm Pilot Device to establish a link with the central communications center 14 in order to refresh the data for the items in the Watch List.

Tapping the "New," button 38 when no entry (item being monitored) is selected invokes the process 38 shown in FIG. 3, and described in more detail herein, through which a new watch list or new entry can be made. When the "New" button 38 is tapped, the dialog screen "New Watch List Information" 39 appears, through which the user can select between creating a new entry or a new watch list. See FIG. 6.

Tapping on the "Edit" button 40 invokes the process 40 shown in FIGS. 3 and 6, and described in more detail herein, through which an existing watch lists or entries can be edited. When the "Edit" button is tapped, the dialog screen "Edit Watch List" 41 appears through which the user can select between renaming or deleting a watch list. See FIG. 6.

The "Send" button 28 is presented to the user when a change has been made to the watch lists or entries. When the "Send" button 28 is tapped, the Palm Pilot Device establishes a link with the central communications center 14 and passes along the changes to the central server 19. In this manner, both the remote Palm Pilot Device and the central server 19 will have the master list 22 and the identification of the watch lists assigned to each of the items in the master list 22.

If the user selects a particular entry, and then taps the trade icon 42, he will be brought to a Trade screen with the symbol filled in. The Trade feature is one of the other features in the application of which the Watch List features is a part.

The Quick Access icon 44 allows a user to invoke a pull down menu in which are listed five most frequently used screens, as defined by the user, and gives immediate navigation to them. See FIG. 6.

Also shown in FIGS. 5 and 6, below the row of icons and buttons, are the Palm Pilot Device Applications button, Menu button 46, and text and number entry screen. Tapping on the Menu button 46 invokes Options and Edit menus, to be described hereinafter, which are implemented in the Watch List Manager Level 24, FIG. 3. In the Options menu the "Edit Entry" selection will not be present unless the user has selected an entry on the screen 25.

The operations invoked by tapping the above icons or buttons will now be described in greater detail with reference to FIGS. 3 and 7 to 9.

Send 28:

As indicated above, the Send button 28 is not presented to the user unless a change has been made to a watch list or watch list entry using one of the drop down menus or dialogs. Once a change has been recorded, the button will become visible and will act to send the watch list back to the central server 19, via the wireless link 12.

When a user is sending, a progress dialog will appear. If the send is successful, the user will get the "Send Watch List Mgr Confirmation (5517)" message:

Send Watch List Mgr Confirmation (5517):
Title: Watch List Info Sent
Icon Indicator Info
Message: Your watch list information has been sent to (service provider) and successfully saved.
Button: OK Tapping OK will bring the user back to the Watch List Manager Level 24 screen. If the user attempts to change screens without sending changed watch list information, he will get the "Send Before Leave? (5519)" error message:

Send Before Leave? (5519):
Title: Send Watch List Information?
Icon Indicator Warning
Message: You have changes to your watch list information that you must send to (service provider) before use. What would you like to do with these changes?
Buttons: Send/Discard/Cancel Tapping Send will send the changes and take the user to the location he wants to go. Tapping Discard will ignore changes and take the user to the location he has requested. Cancel will do nothing but bring the user back to the Watch List Manager Level 24 screen, and the user's changes will be preserved but not sent.

If the connection fails to send the watch list changes, the user gets the error message "Send Watch List Error":

Send Watch List Error:
Title: Cannot Send Watch Lists
Icon Indicator Fail
Message: We were unable to send information about your watch lists to the server at this time. Would you like to revert to your last sent list or hold changes until they can be sent at a later time? Holding changes will disable watch lists until the changes can be sent.
Button: Revert/Hold If the user initiated the dialog via the Send command 28, reverting will bring the user back to the previously sent version of the Watch List Manager Level 24. Holding will bring the user to back to the Watch List Manager Level 24 screen with no changes made. The user's changes will be preserved but not sent, but if the user tries to leave, he will be presented with a Send dialog.

If the user got to the "Cannot Send Watch Lists" dialog through the "Send Before Leave? (5519)" dialog, reverting will bring the user to the newly requested location, and changes to the watch list information will not be retained, but watch lists will work.

Holding will bring the user to the newly requested screen. The user's changes will be preserved but not sent. Holding will disable watch lists, so if the user goes to a watch list, he will get a "Send from Holding" dialog that will inform him he needs to send watch list changes before the watch lists will work. "No" will keep the user in the current watch list, with no information available. "Yes" will bring the user to the Watch List Manager, and will execute a send command automatically.

Send from Holding Dialog:
    Title: Cannot Use Watch Lists
    Icon Indicator Fail
    Message: You are holding changes in your Watch List Manager. In order to use any of your watch lists, you will need to send these changes. Would you like to go to your Watch List Manager and do so now?
    Button: Yes/No Request 30:

The Request button 30 loads watch list information into the Palm Pilot Device off of the central server 19 located at the central communications center 14. If a user has made changes at the Watch List Manager Level 24, and taps the refresh button 30, he will get the dialog "Request Before Send Error" indicating that the refresh will cause a data loss.

Request Before Send Error Dialog:
    Title: Request Watch List Information?
    Icon Indicator Warning
    Message: Are you sure you want to request watch list information from the server before sending? Doing so will cause your changes to be lost.
    Button: Request/Cancel In order to prevent the data loss, the user would press "Cancel" and then tap the "Send" button 28. Hitting "Request" will result in a loss of the changes made by the user.

If the connection fails during a request, the user will get the error dialog "Request Watch List Error." The user will see a screen indicating "Watch List Manager (No Information)."

Figure 7:
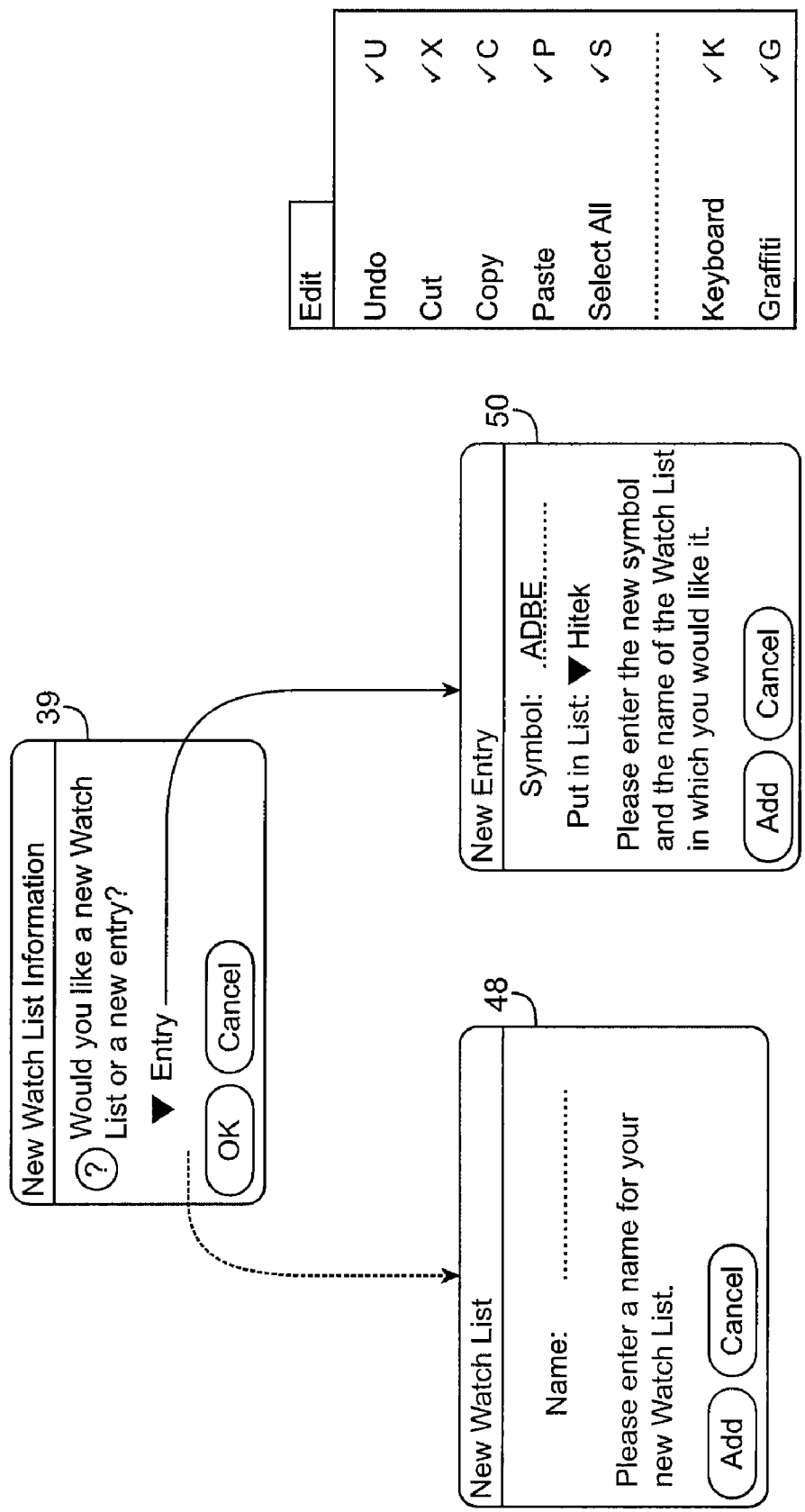
FIG. 7 is an illustrative example of the navigational flow associated with the "New" button when operated in the Watch List Manager level of the embodiment of the present invention as implemented in a Palm Pilot hand held personal organizer.

Request Watch List Error:
    Title: Cannot Retrieve Watch Lists
    Icon Indicator Fail
    Message: We were unable to retrieve information about your Watch Lists at this time.
    Button: OK New 38:

Tapping the "New" button 38 will bring up the "New Watch List Information" dialog 39, FIG. 7 that asks the user to choose whether he would like a new entry or new Watch List. The dialog shows by default in the drop down the item the user last selected. If it is the first time, "Entry" will be selected as the drop down choice. In this way, if a user is trying to rapidly enter a number of entries, this choice will add only one more tap.

The New button 38 is always present during the Watch List Manager Level 24 and the Watch List Level 26. If there are no watch lists, the only choice will be to add a new watch list. This means that one can never add an entry as "not selected" (i.e., without assigning it to a watch list) with the intent of adding it to a list later.

New Watch List 48:

If, in response to the "New Watch List Information" dialog 39 the user selects "Watch List," the "New Watch List" dialog box 48 will appear. See FIG. 7. Watch List names will consist of 1 to 10 letters and numbers. Other characters will not be allowed, nor will spaces. If the user doesn't meet this criterion, he will get the error message "Watch List Name Error."

Watch List Name Error:
    Title: Watch List Name Error
    Icon Indicator Warning
    Message: Your watch list name can be 1 to 10 letters or numbers and cannot have a space.
    Button: OK If a user taps add and no information is filled in, he will get the error dialog "Watch List Incomplete Information."

Watch List Incomplete Information:
    Title: Incomplete Information
    Icon Indicator Warning
    Message: You must fill in a name for your watch list.
    Button: OK If the user attempts to add a name that already exists, he will get the error dialog "New Watch List: Same Name (5518) ." If the user taps OK, he is brought back to the "New Watch List" dialog with the old data still present for editing.

New Watch List: Same Name (5518):
    Title: Name Already Exists
    Icon Indicator Fail
    Message: You already have a Watch List named [name attempted.] Please enter a different name for this Watch List.
    Button: OK If the user reaches 100 watch lists, he will get the error dialog "Too Many Watch Lists (5502)" when he taps the OK button in the "New Watch List Information" dialog 39. Tapping OK will bring him back to the Watch List Manager Level 24 screen.

Too Many Watch Lists (5502):
    Title: Too Many Watch Lists
    Icon Indicator Warning
    Message: You can only have 100 watch lists. You may not add another watch list until another watch list has been deleted.
    Button: OK If the user successfully adds a new list, he will get the confirmation dialog "Add Watch List Confirmation." When the user taps "OK," he will be brought to the Watch List Manager Level 24 screen.

Add Watch List Confirmation:
    Title: Watch List Added
    Icon Indicator Info
    Message: [Watch List name] has been successfully added.
    Button: OK New Entry 50:

If, in response to the "New Watch List Information" dialog 39, the user selects "Entry," the "New Entry" dialog 50 is displayed. If the user successfully adds the entry to the watch list, he will return to the Watch List Manager Level 24 screen with the new entry added, and the list scrolled to reveal it. The defaults for the New Entry dialog 50 fields will be: A blank in Symbol. The drop down will consist of all watch lists that the user has. The default the first time will be the first alphabetical watch list. After the first time, the drop down will stay on the last list selected by the user.

If the user enters an unknown symbol, such unknown symbols will appear in a watch list, but the watch list will have "Unknown" in the price list, and the user can later delete the entry. The use of "Unknown" as a price will not be limited to entries that are misspelled. A valid stock could become decommissioned during mergers or bankruptcy.

If a user taps "add" in the "New Entry" dialog 50 and no information is filled in, he will get the error dialog "Watch List Entry Incomplete Information."

Watch List Entry Incomplete Information:
    Title: Incomplete Information
    Icon Indicator Warning
    Message: You must fill in a symbol.
    Button: OK The Palm Pilot device will perform local validation to see if a user has a valid form for a symbol. A valid stock symbol is 1-5 alpha characters. A valid index symbol is a period followed by 1-4 alpha characters. If the symbol field does not meet this description, the user will get the dialog "Invalid Symbol." OK will return the user to the New Entry dialog.

Invalid Symbol:
Title: Invalid Symbol
Icon Indicator Fail
Message: This is not a valid symbol. Please re-enter.
Button: OK If the entry already exists in the watch list, the user will get no error. The user will be able to list multiple occurrences of the same symbol in a single watch list. Each occurrence will count against the 100-entry limit. If there are already 100 symbols in the watch list manager, the user will be shown the dialog "Too Many Entries (5505)" when he chooses the OK button in the "New Watch List Information" dialog.

When the user taps OK, he will be brought back to the Watch List Manager Level 24 screen.

Figure 8:
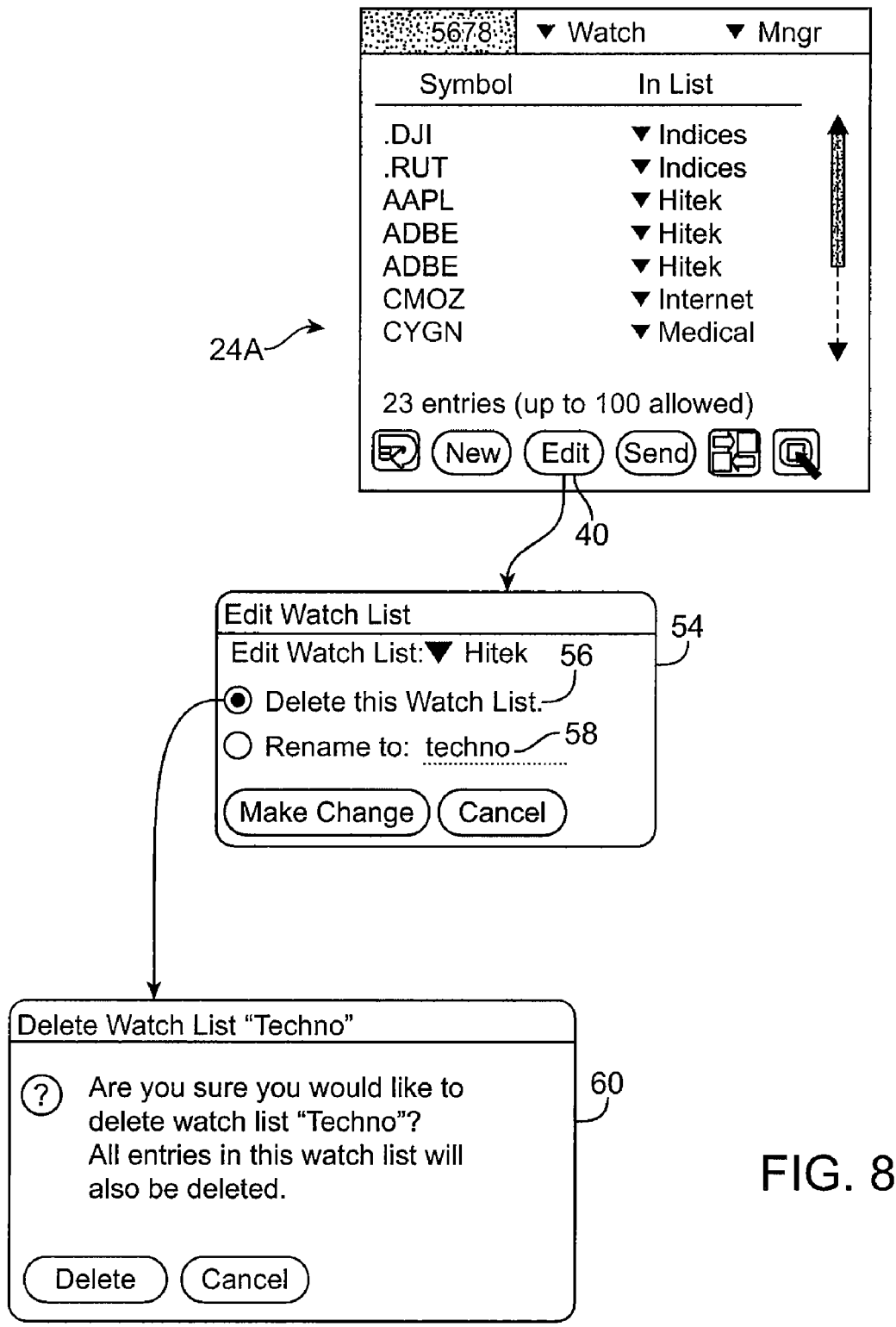
FIG. 8 is an illustrative example of the navigational flow associated with the "Edit" button when operated, when a stock is not highlighted, in the Watch List Manager level of the embodiment of the present invention as implemented in a Palm Pilot hand held personal organizer.
Figure 9:
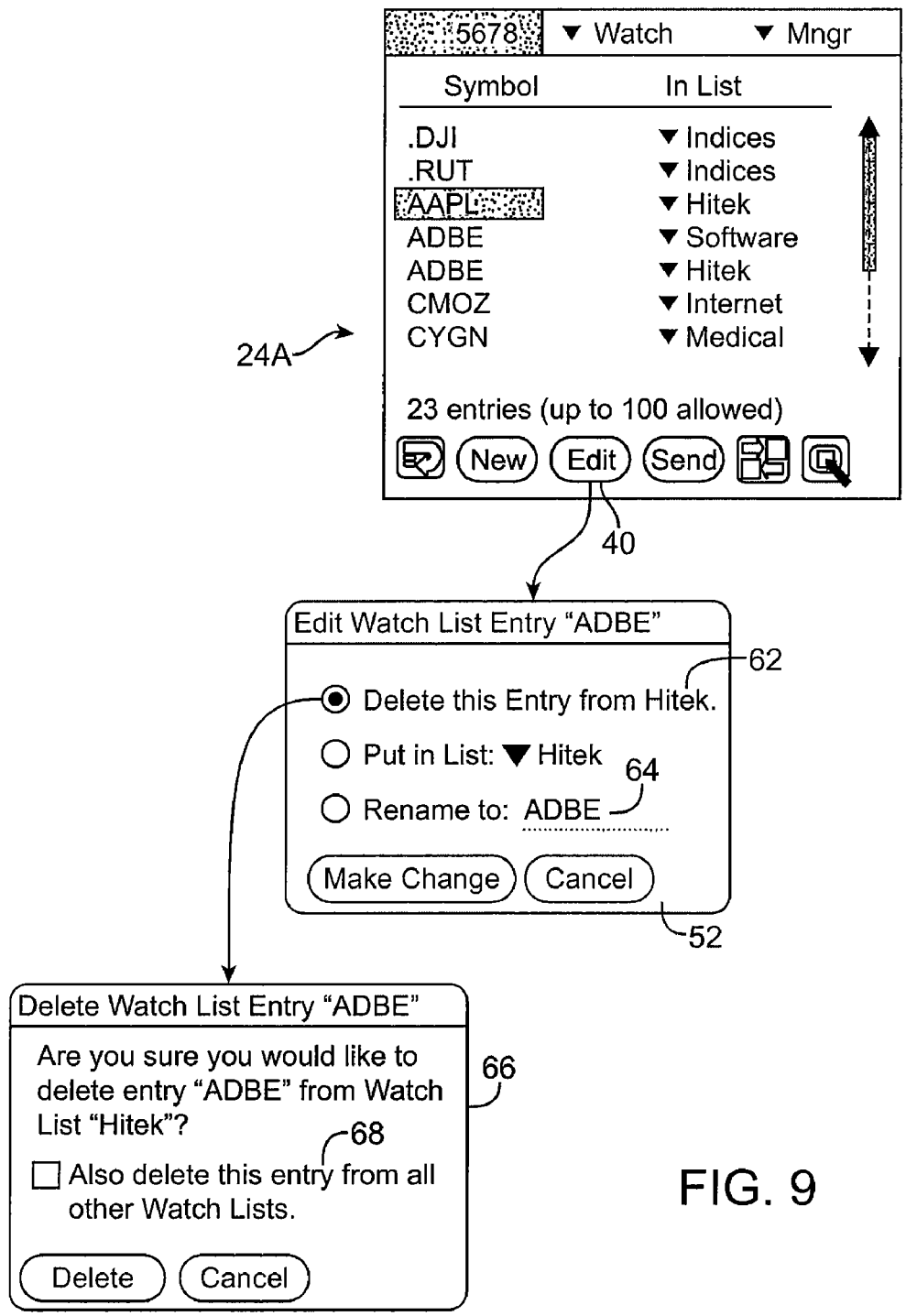
FIG. 9 is an illustrative example of the navigational flow associated with the "Edit" button when operated, when a stock is highlighted, in the Watch List Manager level of the embodiment of the present invention as implemented in a Palm Pilot hand held personal organizer.

Too Many Entries (5505):
Title: Too Many Entries
Icon Indicator Fail
Message: You have reached the maximum number of entries (100) allowed in your watch list manager. In order to add a symbol, you will have to delete another from the list.
Button: OK Edit 40:

Referring now to FIGS. 8 and 9, in this embodiment of the present invention, the Edit button 40 is always present. If the user is on an entry (stock), it will bring him to the dialog: "Edit Watch List Entry" 52. Otherwise, it will bring the user to a dialog that will prompt him to either rename or delete a watch list: "Edit Watch List" 54. The user will have to select which watch list to edit as there will be no way to select one directly.

Edit Watch List 54:

The defaults for the Edit Watch List dialog 54 fields are: The watch list drop down will be the last selected by the user. If it is the first time, it will be the first alphabetical list. The default for the radio button will be the delete option 56, and the rename field 58 will be empty.

If the user chooses to rename the watch list and succeeds, he will get the "Edit Watch List Confirmation" dialog.

Edit Watch List Confirmation:
Title: Watch List Renamed
Icon Indicator Info
Message: Watch List "[Old watch list name]" has been successfully renamed to watch list "[new watch list name.]"
Button: OK If the user taps "OK," he will return to the Watch List Manager Level 24 with changes made. If he fails, the same error conditions and dialogs will appear as in creating a new watch list.

If the user chooses to delete the watch list and taps Make Change, he will be brought to the dialog "Delete Watch List" 60. In either case, if the user taps Cancel, he will return to the Watch List Manager Level 24 with no changes made.

If the user enters a new name which already exists, he will get the error message, just as in the creation of a new watch list discussed above, "New Watch List: Same Name (5518)."

Edit Entry 52:

Referring now to FIG. 9, the dialogs for editing watch list entries will now be discussed. The defaults for the Edit Watch List Entry dialog 52 fields are: The default for the radio button will be the delete option 62. The watch list drop down will be the last selected by the user. If it is the first time, it will be the first alphabetical list. The rename field 64 will be pre-filled with the entry that was selected.

Delete Watch List or Entry:

A user will come to delete either a watch list or an entry from their respective edit dialogs. There are no menus for the delete dialogs. If in the "Edit Watch List" dialog 54, the user chooses to delete the watch list, he will be brought to the "Delete Watch List" dialog 60, FIG. 8, and asked to confirm the deletion. If in the "Edit Entry" dialog 52, the user chooses to delete the entry, he will be brought to the "Delete Watch List Entry" dialog 66, FIG. 9, and asked to confirm the deletion.

Delete Watch List:

If the user selects Delete in the "Delete Watch List" dialog 60, and it successfully occurs, the user will get the confirmation "Delete Watch List Confirmation." Tapping OK will bring the user in this dialog to the Watch List Manager Level 24 with the watch list, and its stocks deleted. If the user chooses to Cancel from the "Delete Watch List" dialog 60, he will be brought back to the Watch List Manager Level 24 without any changes having been made.

Delete Watch List Confirmation:
Title: Watch List and Entries Deleted
Icon Indicator Info
Message: The watch list "[watch list name]" and all of its entries have been successfully deleted from your set of watch lists.
Button: OK Delete Entry:

If the user chooses to delete an entry in the "Edit Watch List Entry" dialog 52, he will get the "Delete Watch List Entry" dialog 66, FIG. 9. If the entry appears in more than one list, a checkbox 68 will be available that will allow the user to delete the entry symbol from all lists in which it occurs. The default is off. (It is to be noted that the example illustrated in FIG. 9, the entry "ADBE" appears in more than one list.) If the user taps Cancel, he will be brought back to the Watch List Manager Level 24 with no changes made.

If the deletion happens successfully, the user will see the dialog "Delete Entry from Watch List Confirmation." If the user taps OK, he will be brought back to the Watch List Manager Level 24 with the changes made.

Delete Entry from Watch List Confirmation—Entry Removed from One List:
Title: Watch List Entry Deleted
Icon Indicator Info
Message: [Entry] has been removed from the Watch List "[Watch List name]."
Button: OK Delete Entry from Watch List Confirmation—Entry Removed from All Lists:
Title: Watch List Entry Deleted
Icon Indicator Info
Message: [Entry] has been removed from all Watch Lists.
Button: OK Watch List Level 26:

As discussed in connection with FIGS. 4 and 5, the user can navigate between the Watch List Manager Level 24 and specific watch lists in the Watch List Level 26 through secondary drop down menu 34. If a user selects to see a watch list from the secondary drop down menu 34, he will be shown the screens 70 or 72 in FIG. 10, for example. Screen 70 shows the information provided for the "hitek" watch list when an index, e.g. ".DJI" is selected. When an index is in a watch list and is selected, the bid and ask fields will be omitted. If volume information is not available, that field will have "n/a" entered.

Screen 72 shows the information provided for the "hitek" watch list when an individual stock, e.g. "AAPL" is selected. Because there is no explicit support for decimal alignment on the Palm Pilot device, and in order to conserve space, the values for Bid, Ask, Volume, High, Low, and % Move are positioned as shown in screens 70 and 72, aligned right after the field label. This is also because the longest labels happen to need the least value space.

Figure 10:
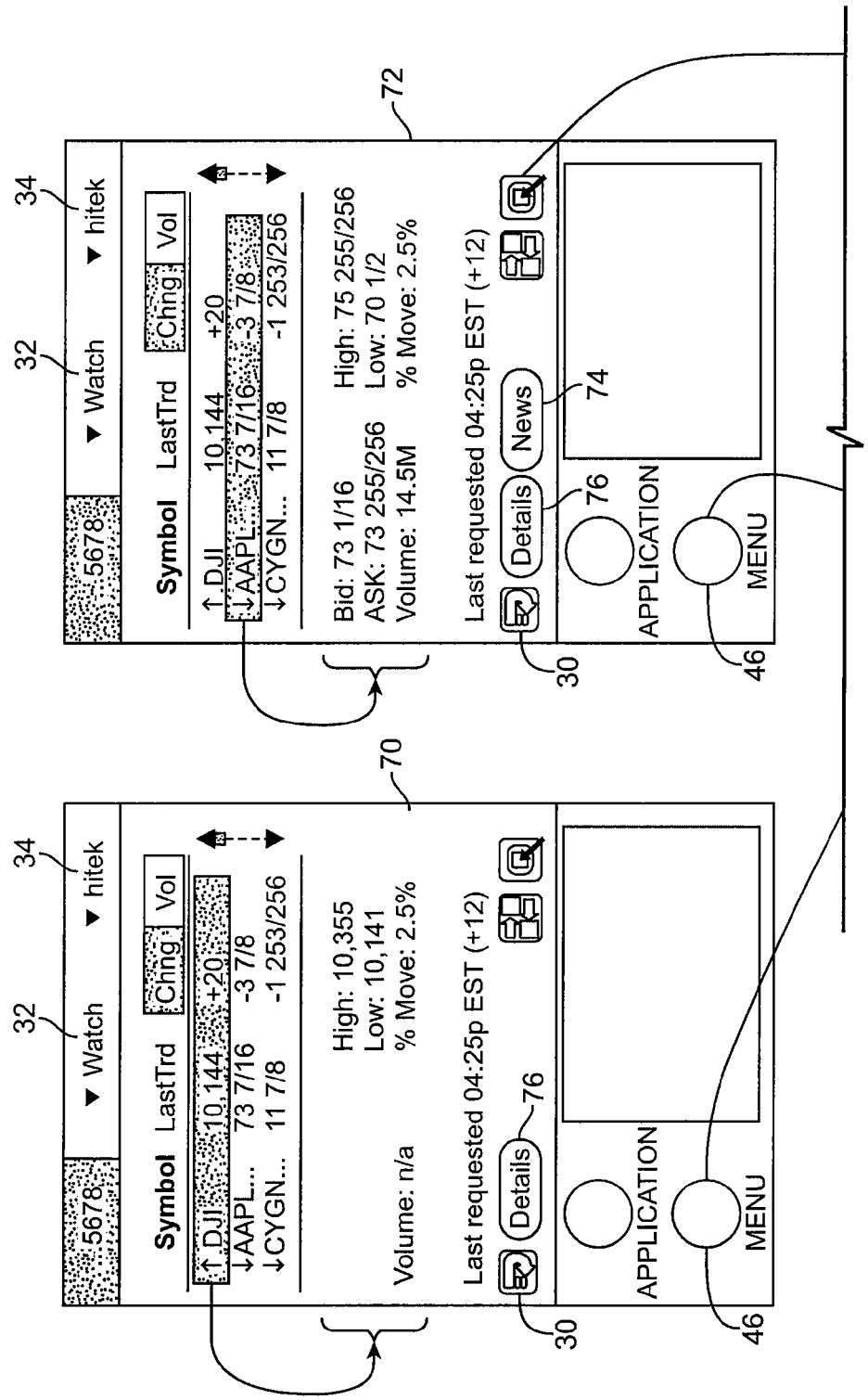
FIG. 10 is an illustrative example of information displayed and navigational flow, when a stock is highlighted or a stock is highlighted, in the Watch List level of the embodiment of the present invention as implemented in a Palm Pilot hand held personal organizer.
Figure 10:
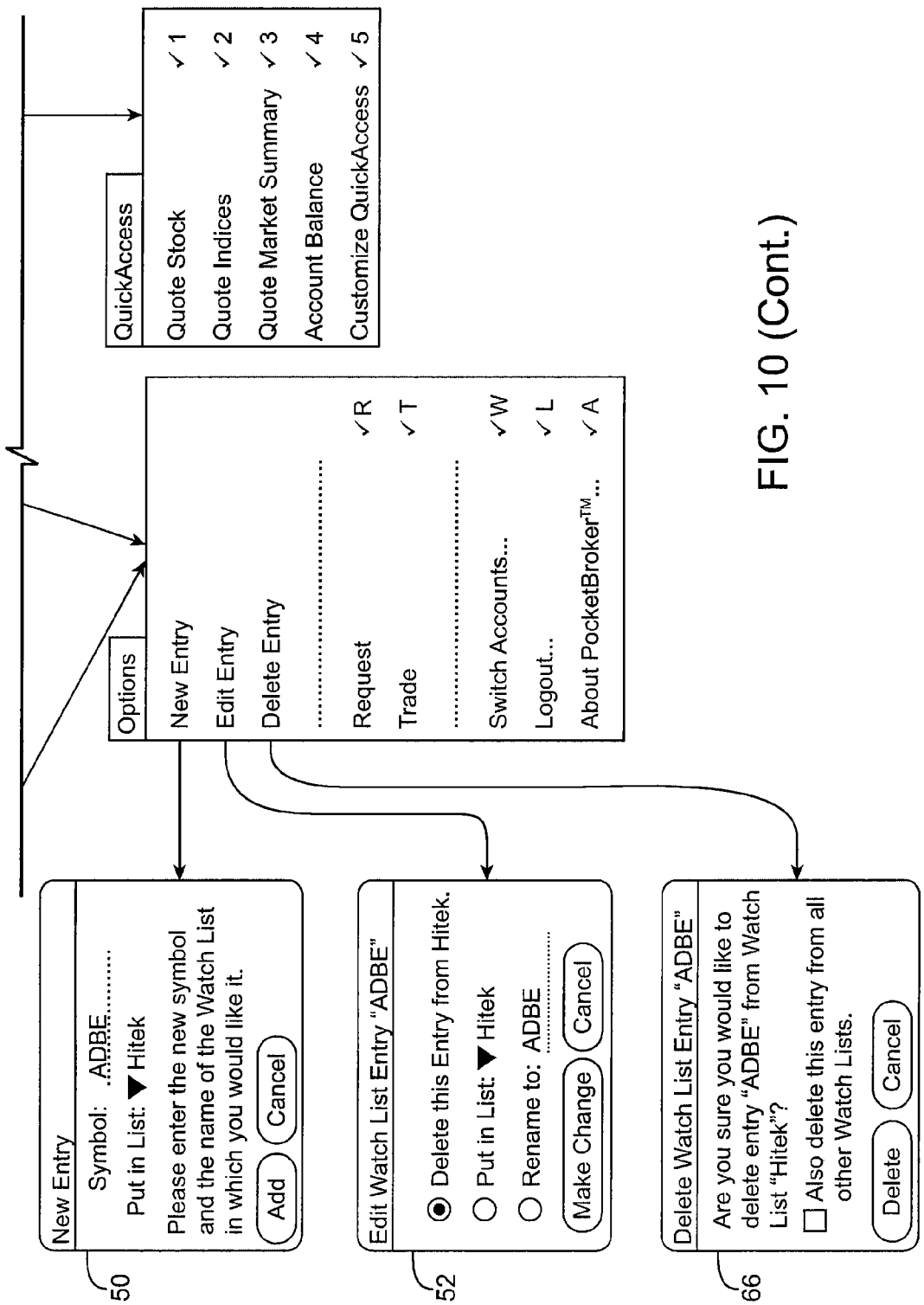

Sorting:

When the user is in the Watch List Level 26, as illustrated in FIG. 10, tapping on the Symbol column header will sort the list by symbol. Tapping on the Last Trd (last trade) will sort by that column. These two will be bolded when each is the sort column. The change and volume radio box serve both to select what data appears in the last column as well as to indicate and execute the sort. The sort upon entry will be the state in which the user last left the watch list. If it is the first entry, the default will be sorted by Symbol. The first time the user taps either of the Chng or Vol boxes, it will go to descending numerical order. If the item is highlighted and is tapped again, the sort order will reverse.

Palm Pilot Menu:

Also shown in FIG. 10 are the navigational paths through which the user can add, edit or delete entries in the watch list. As shown, the Palm Pilot device menu 46 provides the New Entry and Edit Entry and Delete Entry functions for the user. In contrast with the Watch List Manager Level 24, the New, Edit buttons have been removed from the screen in the Watch List Level 26 in order to conserve screen space.

The New Entry menu item will bring the user to the dialog "New Entry" 50, FIGS. 3 and 7. The user will be navigated to Watch List Manager Level 24, and all error conditions defined in the Watch List Manager Level 24 will apply.

The Edit Entry menu item will bring the user to the dialog "Edit Entry" 52, FIGS. 3 and 9, based on the selected entry. The user will be navigated to Watch List Manager Level 24, and all error conditions defined in the Watch List Manager Level 24 will apply. The Delete Entry menu item will bring the user to the dialog "Delete Entry" 66, FIGS. 3 and 9, based on the selected entry. The user will be navigated to Watch List Manager Level 24, and all error conditions defined in the Watch List Manager Level 24 will apply.

Request:

The Request button 30 will update the entry information. It is always active.

News:

The News button 74 will appear when there is market moving news headlines for the selected stock. If the user selects news, he will effectively execute a search for market moving news on the company selected and will be brought directly to the headlines result screen for company news. If a stock does not have market-moving news, and it is selected, the News button will disappear. If the user jumps to headlines from this screen, a "Watch" button will appear that will allow the user to return to the watch list he left in order to see the news. This button will only appear from a direct jump to the headlines from the watch list news button. If the user navigates to any other primary and/or secondary, and then returns, the context-sensitive "Watch" button goes away. Also, if the user executes a new headline search, upon refresh, the button will go away.

Details:

A user will be able to get details on a stock symbol. The Details button 76 will bring up the Quote Details dialog, for both stock and indices, a feature associated with another function available from the primary drop down menu 32 in the application of which the present invention is a feature. Here, however, if the user closes the Quote Details dialog via the "Back to Watch," he will return to the Watch List screen.

The features and operations described herein are implemented in a conventional manner, and in conformance with the software development and application interface standards and user interface standards for the Palm Pilot device. While the content, and thereby the organizational features described above are novel, they are implemented using standard Palm Pilot programming techniques.

The terms expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

What is claimed is:

1. A method for organizing information for a plurality of data items which are being tracked in a computing device of the type which is capable of exchanging information with a communications center, comprising:

tracking a plurality of data items at the communications center that comprises a subset of available data items;

receiving from a user an instruction at the communications center defining at least one category tag for each of the plurality of data items being tracked;

maintaining a data list at the communications center, which includes information for all of the plurality of data items being tracked, and that is limited to a predetermined number of data items;

displaying on the data list a first number which indicates a running total of the number of items in the data list, and displaying a second number which indicates the predetermined number of items permitted in the data list;

updating the data lists by the communications center with at least one user defined category tag for each of the plurality of data items being tracked; and sending the updated data list to the computing device.

2. The method of claim 1, further comprising receiving updates to the data list items being tracked, wherein the updates are generated by the computing device.

3. The method of claim 1, wherein sending the data list to the computing device is initiated by a request from the computing device.

4. The method of claim 1, wherein at least one of the plurality of data items being tracked includes at least two user defined category tags.

5. The method of claim 1, further comprising maintaining a copy of the data list in the computing device.

6. A system for organizing information for a plurality of data items being tracked comprising:

a communications center of the type which is capable of exchanging information with a computing device, wherein the communications center:

tracks a plurality of data items that comprises a subset of available data items in response to receiving an instruction to track the plurality of data items;

receives an instruction from a user defining at least one category tag for each of the plurality of data items being tracked;

maintains a data list, which includes information for all of the plurality of data items being tracked, wherein the data list is limited to a predetermined size;

displays on the data list a first number which indicates a running total of the number of items in the data list, and displays a second number which indicates the predetermined number of items permitted in the data list;

updates the data list with the at least one user defined category tag for each of the plurality of data items being tracked; and sends the updated data list to the computing device.

7. The system of claim 6, wherein the communications center further receives updates to the data list items being tracked, wherein the updates are generated by the computing device.

8. The system of claim 6, wherein sending the data list to the computing device is initiated by a request from the computing device.

9. The system of claim 6, wherein at least one of the plurality of data items being tracked includes at least two user defined category tags.

10. The system of claim 6, wherein the computing device maintains a copy of the data list.

11. The method of claim 1 wherein at least one item of the plurality of data items being tracked is associated with at least two user defined category tags.

12. The method of claim 1 wherein changing the user defined category tag associated with an item of the plurality of data items with the computing device causes the change to be sent by the computing device to the communications center.

13. A method for organizing information for a plurality of data items which are being tracked in a computing device of the type which is capable of exchanging information with a communications center, comprising:

tracking a plurality of data items at the communications center that are a subset of available data items;

receiving from a user an instruction at the communications center defining at least one category tag for each of the plurality of data items being tracked;

maintaining a data list at the communications center, which includes information for all of the plurality of data items being tracked, and that is limited to a predetermined number of data items;

displaying on the data list a first number which indicates a running total of the number of items in the data list, and displaying a second number which indicates the predetermined number of items permitted in the data list updating the data list by the communications center with at least one user defined category tag for each of the plurality of data items being tracked;

sending the updated data list to the computing device; and receiving updates to the data list from the computing device, wherein if the computing device is unable to communicate with a communications server, the data list in the computing device is not updated and is placed into a hold state.

14. The method of claim 13, wherein once the computing device is again able to communicate with the communications server, the updates to the data list are sent to the communications center.

* * * * *